US009009744B2

(12) United States Patent
Nakazawa et al.

(10) Patent No.: US 9,009,744 B2
(45) Date of Patent: Apr. 14, 2015

(54) LIBRARY SYSTEM

(71) Applicant: Hitachi-LG Data Storage, Inc., Tokyo (JP)

(72) Inventors: Kazuki Nakazawa, Tokyo (JP); Yuzo Takeuchi, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 14/020,917

(22) Filed: Sep. 9, 2013

(65) Prior Publication Data

US 2014/0096150 A1    Apr. 3, 2014

(30) Foreign Application Priority Data

Sep. 28, 2012  (JP) ................................. 2012-215493

(51) Int. Cl.
*G11B 17/22* (2006.01)
*G11B 17/04* (2006.01)

(52) U.S. Cl.
CPC ............ *G11B 17/228* (2013.01); *G11B 17/225* (2013.01)

(58) Field of Classification Search
USPC ......... 720/600, 615; 369/30.24, 30.36, 53.12, 369/53.13, 53.18, 53.19
See application file for complete search history.

(56) References Cited

U.S. PATENT DOCUMENTS

2006/0005209 A1* 1/2006 Chiang et al. ................. 720/600
2007/0133116 A1* 6/2007 Goodman et al. .............. 360/69

FOREIGN PATENT DOCUMENTS

| JP | 62197950 A | * | 9/1987 |
| JP | 06325452 A | * | 11/1994 |
| JP | 09115229 A | * | 5/1997 |
| JP | 2000285566 A | * | 10/2000 |
| JP | 2013-114735 A |  | 6/2013 |

* cited by examiner

*Primary Examiner* — Will J Klimowicz
(74) *Attorney, Agent, or Firm* — Baker Botts L.L.P.

(57) ABSTRACT

The present invention relates to a library system including a disc recording/reproducing unit, a disc container, and a disc transport unit for transporting a disc between the disc recording/reproducing unit and the disc container. In order to improve the reliability of the operation of moving the disc from the disc recording/reproducing unit to the disc transport unit, a disc transport controller determines the situation in both the disc recording/reproducing unit and the disc transport unit, and error-stops the operation according to the result of the determination. Alternatively, the disc transport controller retries the movement of the disc, by pulling the disc into the disc transport unit or returning the disc to the disc recording/reproducing unit, and by finely adjusting the relative positions of the disc recording/reproducing unit and the disc transport unit if necessary, in order to solve the problem of damage to a surface of the disc.

7 Claims, 12 Drawing Sheets

FIG. 6
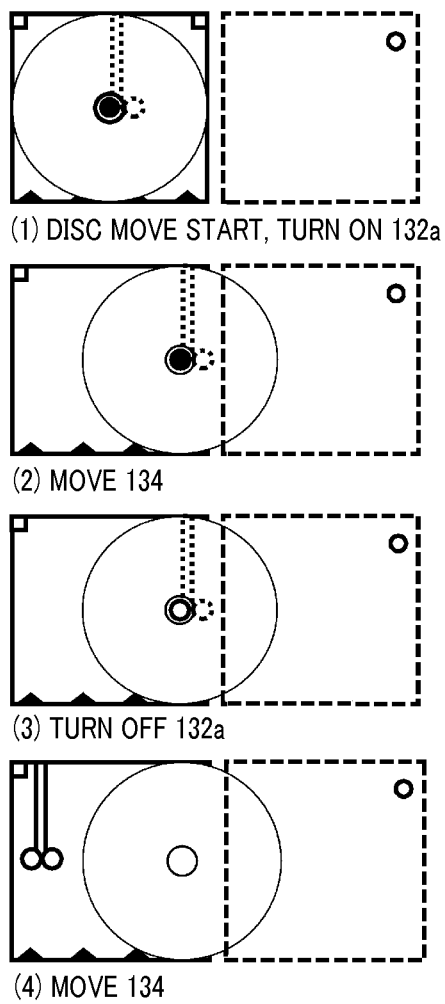
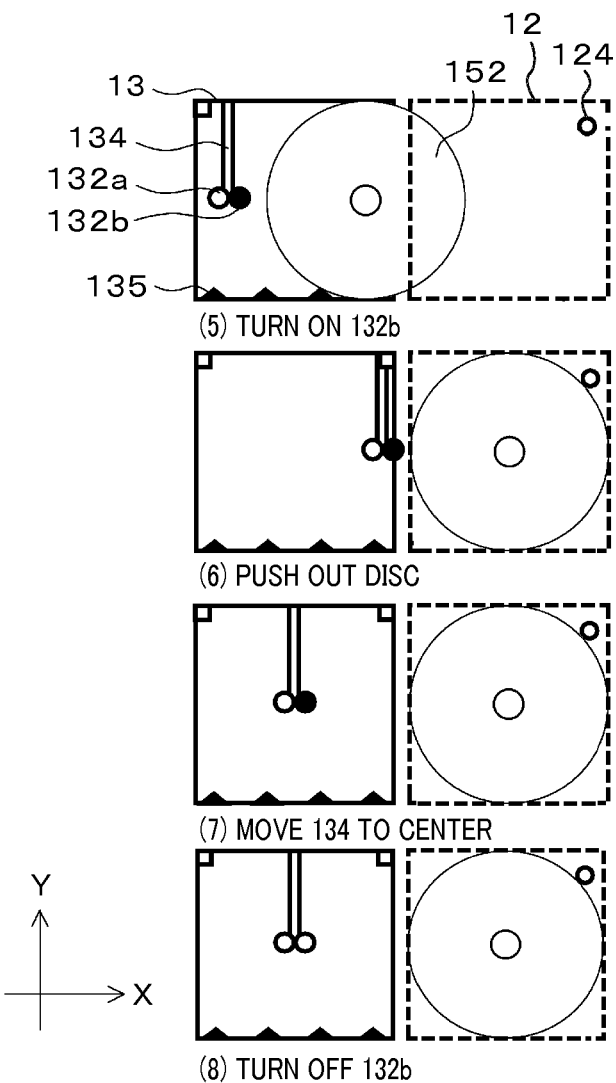

FIG. 7

| CASE | ODD ERROR | TRANSPORT UNIT ERROR | RECOVERY DETERMINATION | DISC STATE |
|---|---|---|---|---|
| 1 | NO ERROR | NO ERROR | — | 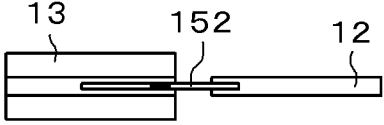 13  152  12 |
| 2 | NO ERROR | NO DISC DETECTED | NOT POSSIBLE | 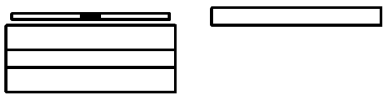 |
| 3 | NO ERROR | INSUFFICIENT AMOUNT OF DISC INSERTION | POSSIBLE | 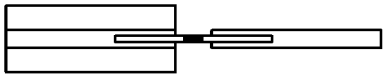 |
| 4 | NO ERROR | ABNORMALITY DETECTED | NOT POSSIBLE | 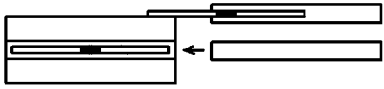 |
| 5 | NO ERROR | EXCESS NUMBER OF CAPTURES | POSSIBLE |  |
| 6 | BACK PUSH | NO ERROR | POSSIBLE | 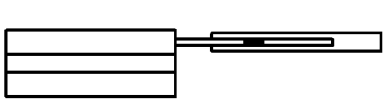 |
| 7 | BACK PUSH | DISC DETECTED | NOT POSSIBLE | 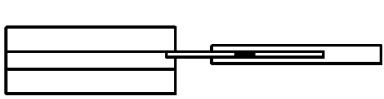 |
| 8 | BACK PUSH | ABNORMALITY DETECTED | NOT POSSIBLE | 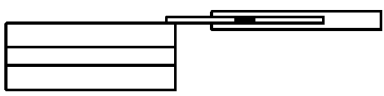 |

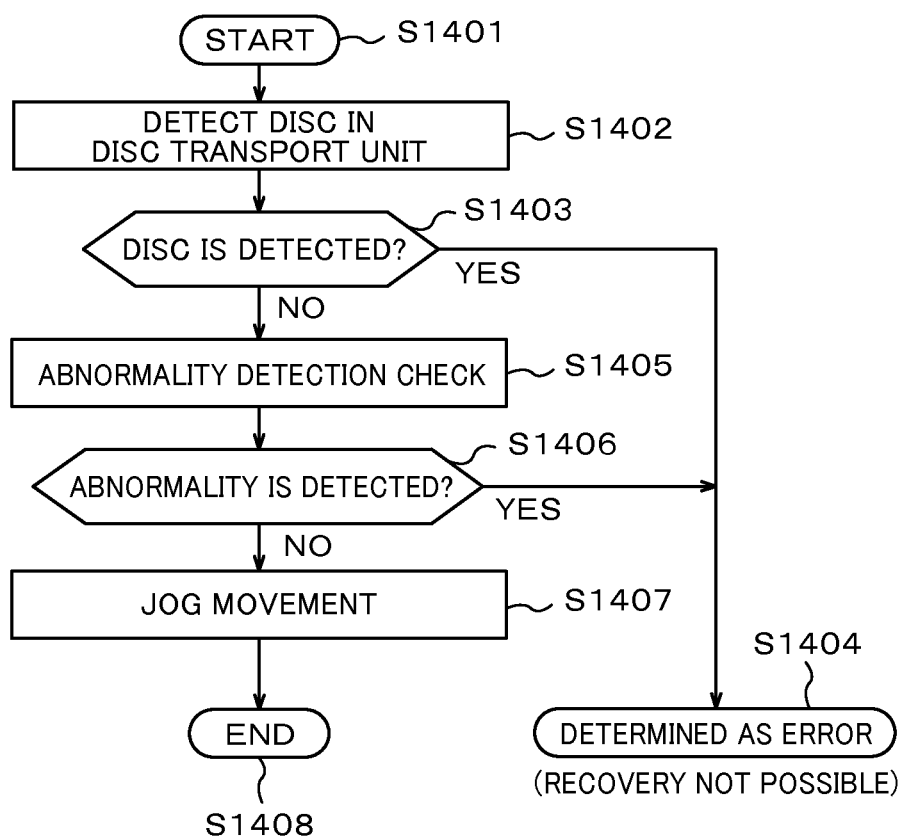

LIBRARY SYSTEM

INCORPORATION BY REFERENCE

This application relates to and claims priority from Japanese Patent Application No. 2012-215493 filed on Sep. 28, 2012, the entire disclosure of which is incorporated herein by reference.

BACKGROUND OF THE INVENTION (1) Field of the Invention

The present invention relates to a library system, and more particularly, to a library system with a highly reliable recovery process.

(2) Description of the Related Art

Storage devices that use optical discs as recording media for recording and reproducing information data are widely used. As is well known, the optical disc is a recording medium that can be installed and removed from the storage device.

With the recent popularity of Blu-ray disc and the development of multiple recording layers, the recording density of an optical disc has been increased. However, in many industries such as financial services, a large number of data must be stored for a long time, so that a further increase in the recording density is expected. Thus, an optical disc library system has been developed as a mass storage device suitable for long-term storage of data.

The optical disc library system includes a container portion in which a plurality of optical discs can be placed, and an optical disc drive (hereinafter, simply referred to as an ODD). The ODD is the device for writing and reading information data to and from the optical disc. Further, the optical disc library system has a carrier mechanism for selecting one of the optical discs placed in the container portion, loading the selected optical disc into the ODD, and removing the particular disc from the ODD to place in the container portion.

SUMMARY OF THE INVENTION

In the library system, it is important that an optical disc transport unit of the carrier mechanism can smoothly exchange optical discs with the ODD. For example, in a slim slot type ODD, the error in the position of the optical disc transport unit relative to the slot for inserting or ejecting an optical disc should be small in order to exchange the optical disc. For this reason, the library system has a position sensor to detect the position of the optical disc transport unit with respect to the ODD.

However, even if the position sensor is used, a small error occurs in the relative position due to friction or other factors. In this case, the library system may not exchange the optical disc between the ODD and the optical disc transport unit. Further, the optical disc may stop when contacting or colliding with an unwanted component, resulting in an error in the transport operation.

In order to recover from the error in the transport operation, in the existing library system, the optical disc transport unit first detects an error in a capture operation of an optical disc, for example, by detecting the presence of the optical disc. Further, the optical disc transport unit repeats the operation of exchanging the optical disc by slightly changing the relationship between the relative positions of the ODD and the optical disc transport unit, until the number of retries reaches a predetermined number of times.

However, when the recovery is decided only by the decision of the optical disc transport unit as described above, it is difficult to sufficiently understand the actual position of the optical disc. Thus, when the relationship between the relative positions of the ODD and the optical disc transport unit is changed, the optical disc may be damaged and at worst the recorded data may be lost.

Thus, for further development in the use of the library system, it is important to improve the reliability of the recovery process when an error occurs in the transport operation.

The present invention addresses the above identified problems by providing a library system with a highly reliable recovery process.

The present invention is to solve the above problems by providing a library system for storing a plurality of recording media to record and reproduce data. The library system includes: a disc container for storing a plurality of discs which are the recording media; an ODD for writing and reading information data to and from the disc; a disc transport unit for transporting and exchanging the disc by moving between the disc container and the ODD; and a controller for controlling the operation of the library system.

When an error occurs in the operation of moving the disc loaded into the ODD to the disc transport unit, the controller retries the operation of moving the disc, based on both information about a state of the ODD and information about a state of the disc container.

According to the present invention, it is possible to provide a library system with a highly reliable recovery process, and contribute to the improvement of the basic performance of the library system.

BRIEF DESCRIPTION OF THE DRAWINGS

These and other features, objects and advantages of the present invention will become more apparent from the following description when taken in conjunction with the accompanying drawings wherein:

FIG. 6 is a cross-sectional view showing the operation of moving the optical disc from the optical disc transport unit to the ODD according to an embodiment of the present invention;

FIG. 7 is a view of the state of the optical disc when moving from the ODD to the disc transport unit according to an embodiment of the present invention;

FIG. 11 is a flow chart of the operation of back pushing in the disc transport unit in FIG. 8B.

DETAILED DESCRIPTION OF THE EMBODIMENT

Hereinafter, the embodiment of the present invention will be described with reference to the accompanying drawings.

First, the general configuration and operation of a library system will be described.

As is well known, recording media used by an ODD are optical discs that can be installed and removed from the drive. Examples of the optical disc are compact disc (CD), digital versatile disc (DVD), and Blu-ray disc (BD). Further, the optical disc has different types, including ROM type (for example CD-ROM) that can only read data, R type (for example, BD-R) that can write data only once, and RE, RAM, or RW type (for example BD-RE) that can rewrite data. Further, the optical disc also includes a single-layer disc having only one recording layer, and a multi-layer disc having a plurality of recording layers. In the present embodiment, the library system may use all of these optical discs or may use some of these optical discs.

In the following description, the optical disc is simply referred to as the disc.

Figure 1:
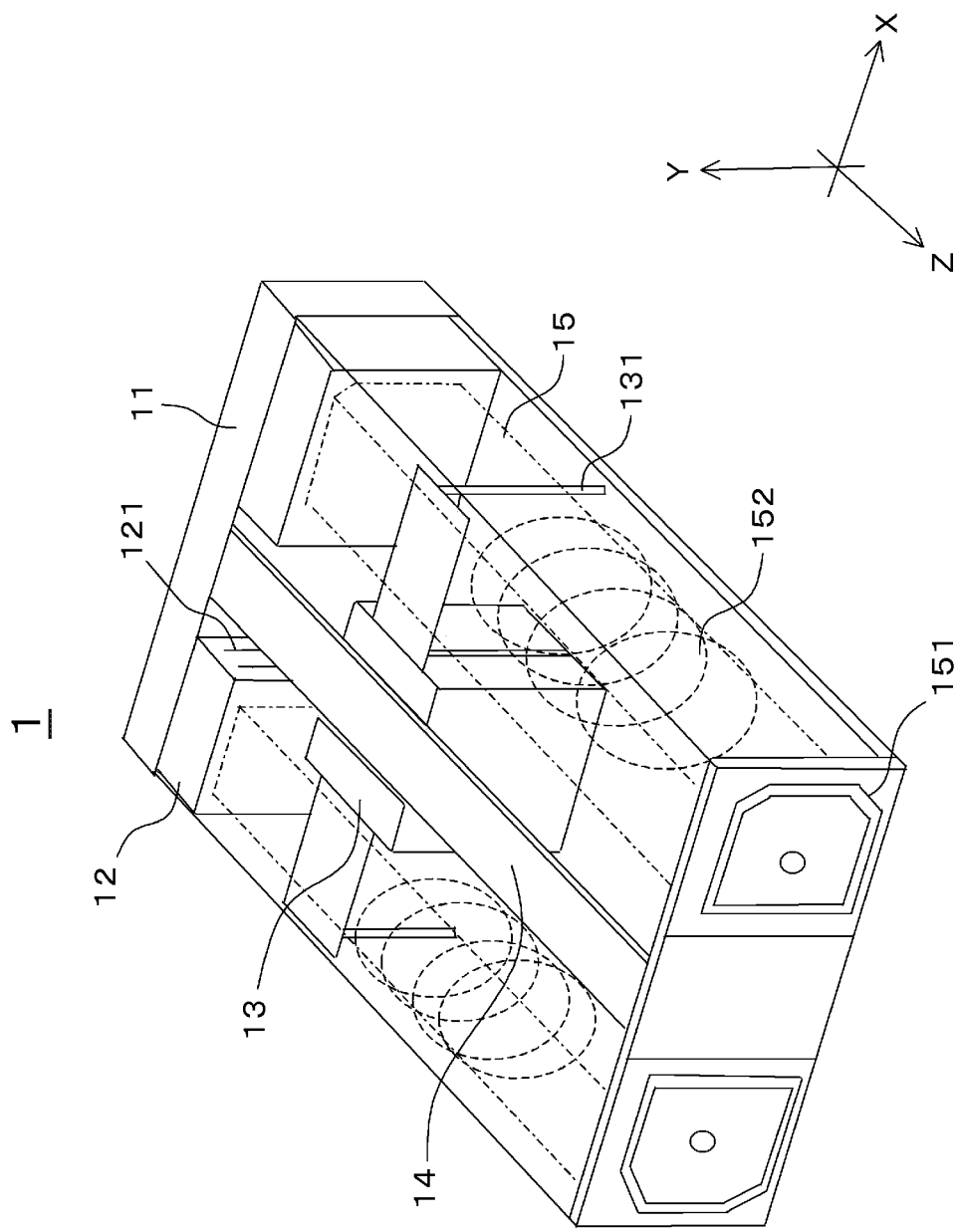
FIG. 1 is an overall view of a library system according to an embodiment of the present invention.

FIG. 1 is an overall view of a library system 1 according to an embodiment of the present invention. Here, it is shown the state as seen obliquely from the upper front side of the library system 1 with a part of the exterior face removed. The front side referred herein is the side on which an entrance 151 of a disc container is present.

In order to clarify the relationship with the figures shown below, the three-dimensional directions of X, Y, and Z axes are shown on the right side of FIG. 1. The X axis extends from the left side to the right side of the front of the library system 1, the Y axis extends upward from the bottom surface side of the front, and the Z axis extends forward from the back side.

A disc container 15 that can be installed and removed from the library system 1 is inserted into and ejected from the entrance 151 of the disc container in the back direction of the library system 1. The operation of inserting and ejecting the disc container can be performed manually by the user, or using some power assist operation of the library system 1. A plurality of discs 152 (for example, 250 discs) can be placed in the disc container 15. In FIG. 1, as an example, the discs 152 are placed standing substantially upright with the label surface and the recording surface facing each other. It is preferable that a slit (not shown) is provided on the bottom of the inside of the disc container 15 in order to position the disc 152.

Here is an example of using two disc containers 15 on the right and left sides with a disc transport unit 13 between them, which will be described below. In the above example, the library system 1 can load 500 discs 152. This is an example, and for example, it is also possible to use one disc container 15. In the case of using two disc containers, the library system 1 can perform the desired operation even if only one disc container 15 is inserted.

When the disc container 15 is inserted into the library system 1, the end on the back side of the disc container 15 is located in the vicinity of a disc recording/reproducing unit 12.

Similarly to the disc container 15, the disc recording/reproducing unit 12 is provided on each of the left and right sides with the disc transport unit 13 between them. The disc recording/reproducing unit 12 has an ODD. Each disc recording/reproducing unit 12 may have one ODD, but preferably has multiple (for example, several) ODDs in order to increase the operation speed. Here, there are two slots 121 for inserting and ejecting the disc. In other words, two ODDs are provided on one side. As is well known, each ODD rotates the loaded disc 152 by a spindle motor (not shown), and records or reproduces data by an optical pickup.

The disc transport unit 13, a first disc move part 131, and a move part 14 of the disc transport unit are components for transporting the disc 152 between the disc recording/reproducing unit 12 and the disc container 15. The move part 14 of the disc transport unit moves the disc transport unit 13 and the disc move part 131, for example, by a motor and a gear (which are not shown and whose location and shape are not particularly limited).

First, the case of transporting the disc 152 from the disc container 15 to the disc recording/reproducing unit 12 will be described.

For example, based on a command from a disc transport controller 11 (here, the reference numeral is shown in the rear panel) that is mounted in a circuit board (not shown) inside the rear panel of the library system 1, the move part 14 of the disc transport unit moves the disc transport unit 13 and the first disc move part 131, to the position of the slit of the disc container 15 in which the disc corresponding to the command is stored. Next, the first disc move part 131 as well as a second disc move part 132 (not shown) within the disc transport unit 13 are moved, for example, by a motor and a gear (which are not shown, and can be included in the disc transport unit 13). In this way, the disc corresponding to the command is moved from the disc container 15 to the inside of the disc transport unit 13.

Next, based on the command from the disc transport controller 11, the move part 14 of the disc transport unit moves the disc transport unit 13 and the first disc move part 131 to the position of one of the two ODDs included in the disc recording/reproducing unit 12, which corresponds to the command of the disc transport controller 11. Further, the second disc move part 132 within the disc transport unit 13 is moved, for example, by the motor and gear to move the disc to be transported from the disc transport unit 13 to the inside of the ODD. In this way, the disc recording/reproducing unit 12 can record or reproduce data to or from the newly transported disc.

Next, the case of transporting the disc 152 from the disc recording/reproducing unit 12 to the disc container 15 will be described.

Based on a command from the disc transport controller 11, the move part 14 of the disc transport unit moves the disc transport unit 13 and the first disc move part 131 to the position of the ODD of the disc recording/reproducing unit 12 in which the disc corresponding to the command is stored. Next, the second disc move part 132 within the disc transport unit 13 is moved, for example, by the motor and gear to move the disc corresponding to the command to the inside of the disc transport unit 13 from the ODD.

Next, based on the command from the disc transport controller 11, the move part 14 of the disc transport unit moves the disc transport unit 13 and the first move part 131 to the position of one of the slits included in the disc container 15, in response to the command of the disc transport controller 11. Further, the second disc move part 132 within the disc transport unit 13 is moved, for example, by the motor and gear to move the disc to be transported to the inside of the disc container 15 from the disc transport unit 13. In this way, the disc whose operation has been completed in the disc recording/reproducing unit 12 is stored again in the disc container 15.

With the operation described above, the library system 1 can access a large number of discs at high speed, contributing to increasing the usability of the system for the user who processes a large amount of data.

Note that when the disc stored in the disc container 15, for example, shown on the right side of FIG. 1, is transported to the disc recording/reproducing unit 12 by the disc transport unit 13, it is possible to set the disc to be loaded into an arbitrary one of the right or left disc recording/reproducing unit 12. Further, it is possible to arbitrarily set the position for storing each disc in the disc container 15, or to set the discs to be stored in a fixed position. This is determined by the command of the disc transport controller 11.

The next describes the mechanism, in particular, the second disc move part 132 for moving the disc 152 between the disc transport unit 13 and the disc recording/reproducing unit 12 or the disc container 15.

Figure 2:
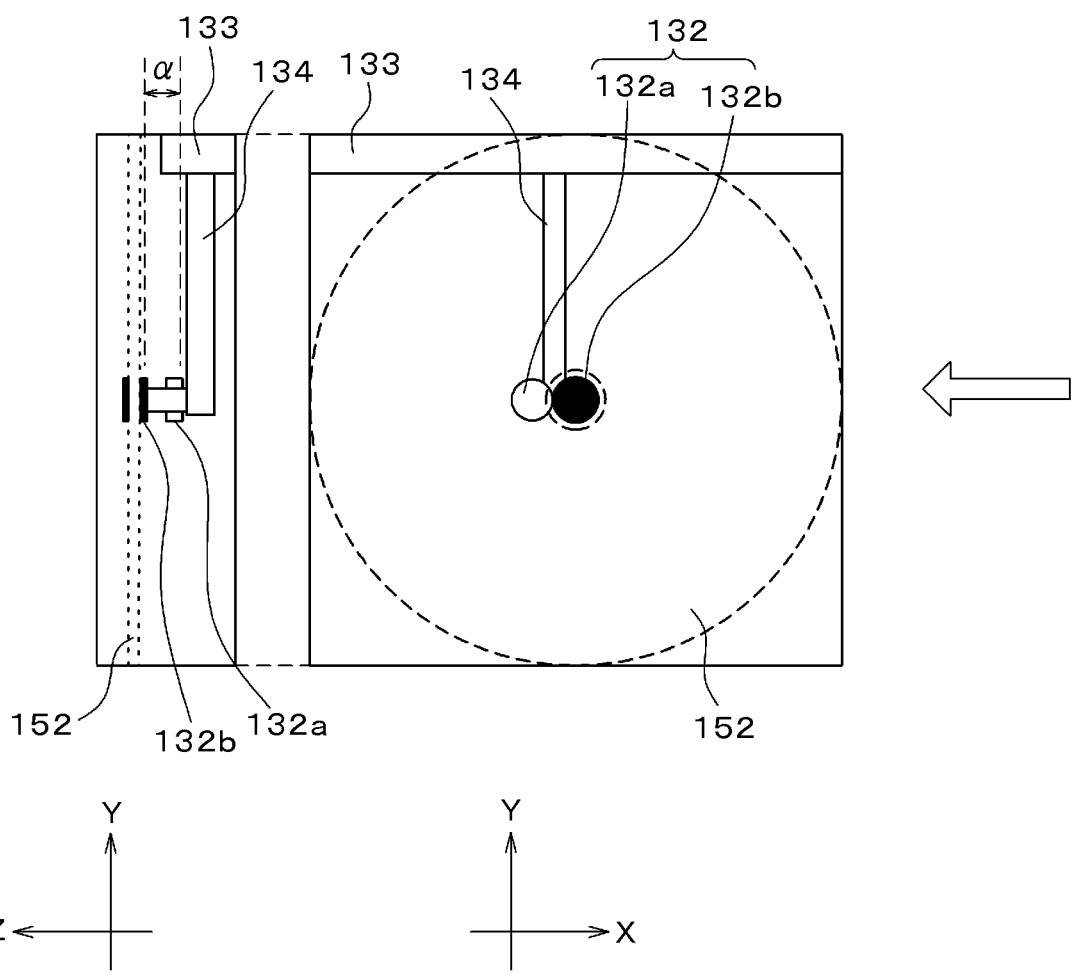
FIG. 2 is a cross-sectional view in the X-Y plane and Y-Z plane of an optical disc transport unit according to an embodiment of the present invention.

FIG. 2 is a cross-sectional view in the X-Y plane and Y-Z plane of the optical disc transport unit 13 according to an embodiment of the present invention. FIG. 2 shows the state in which the disc 152 indicated by the dashed line is placed in the disc transport unit 13. The disc 152 is moved from the disc recording/reproducing unit 12 or the disc container 15, neither shown, located on the right side of the figure, in the direction indicated by the arrow and is placed in the disc transport unit 13. Then, the disc 152 is transported to the disc container 15 or the disc recording/reproducing unit 12. Note that in the cross-sectional view in the X-Y plane, the components behind the disc 152 are indicated by the solid line assuming that the disc 152 is transparent. Further, the cross-sectional view in the Y-Z plane shows the cross-sectional view as seen from the direction of the arrow described above.

Further, here is the example in which the optical disc transport unit 13 transports one disc. However, a plurality of mechanisms may be included to transport a plurality of discs. An arm 134 is moved in both the positive and negative directions of the X axis along a guide 133. The second disc move part 132 is provided at the end of the arm 134. In the example shown in the figure, two second disc move parts 132a and 132b are provided. The second disc move part 132a is located at a different position from the disc 152 on the Z axis. The second disc move part 132b is located inside the center hole of the disc 152. Each of the second disc move parts 132a and 132b includes, for example, an electromagnet, a permanent magnet, and a coil spring. The parts indicated by the reference numerals 132a, 132b in the figure are, for example, permanent magnets. These permanent magnets move in the positive and negative direction of the Z axis, so that they are located at the position indicated as 132a by the pull of the coil spring when the electromagnet is not magnetized, and located at the position indicated as 132b by the magnetic force when the electromagnet is magnetized.

In the following description, OFF is the state when the second disc move part 132 is located at the position of 132a in FIG. 2, and ON is the state in which the second disc move part 132 is located at the position of 132b. Further, the second disc move part 132 in the ON state is blacked out in the figure.

The disc transport controller 11 moves the disc 152, as described below with reference to FIGS. 5 and 6, by switching ON or OFF the state of the second disc move parts 132a and 132b according to the situation.

The next describes installation (also referred to as insertion or load) and removal (also referred to as ejection) of the disc to and from the ODD of the disc recording/reproducing unit 12.

Figure 3:
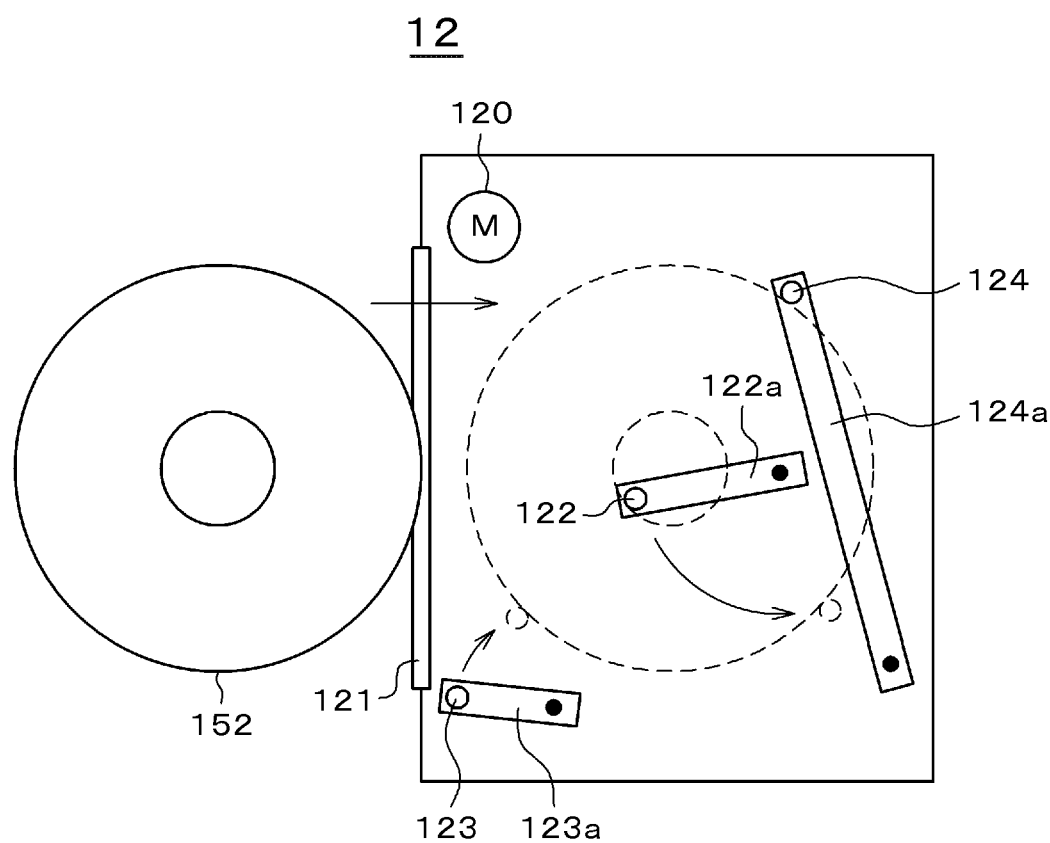
FIG. 3 is a plan view showing the operation of loading an optical disc into the ODD according to an embodiment of the present invention.

FIG. 3 is a plan view showing the operation of installing the optical disc 152 into the ODD in an embodiment of the present invention, which shows an example of performing slim slot disc loading. The inserted disc 152 is moved to the inside by the rotation of a loading motor 120.

Inside the ODD there is provided a roller for holding the periphery of the disc 152. The roller is mounted in a lever and an arm, whose location is moved according to the position of the disc 152. A disc roller 122 is provided in a disc lever 122a which is a movable part. The disc roller 122 is located at the position indicted by the solid line when the disc 152 is present on the outside of the ODD. However, when the disc 152 is inserted, the disc lever 122a moves while contacting the outer periphery of the disc 152 as shown by the arrow in the figure. When the loading of the disc 152 is completed, the disc lever 122a supports the disc 152, for example, at the position indicated by the dashed line. An insert roller 123 is provided in an insert arm 123a which is a movable part. When the disc 152 is inserted, the insert roller 123 moves as shown by the arrow in the figure. When the loading of the disc 152 is completed, the insert roller 123 supports the disc 152, for example, at the position indicated by the dashed line. An eject roller 124 is provided in an eject arm 124a which is a movable part. The eject roller 124 hardly moves during the loading. However, when the loading of the disc 152 is completed, the eject roller 124 supports the disc 152, for example, at the position as shown in the figure.

The ODD has switches for generating a logical signal corresponding to the positions of the lever and the arm with their own rollers, respectively. One is a switch that switches when the disc roller 122 is slightly moved to the back side due to the insertion of the disc 152 from the slot 121. This is called disc insert switch or load switch. The other one is a switch that switches when the inset roller 123 reaches the position indicated by the dashed line in FIG. 4, which is called play switch. There is also an eject switch that switches according to the position of the eject roller 124, which will be described with reference to FIG. 4.

Figure 4:
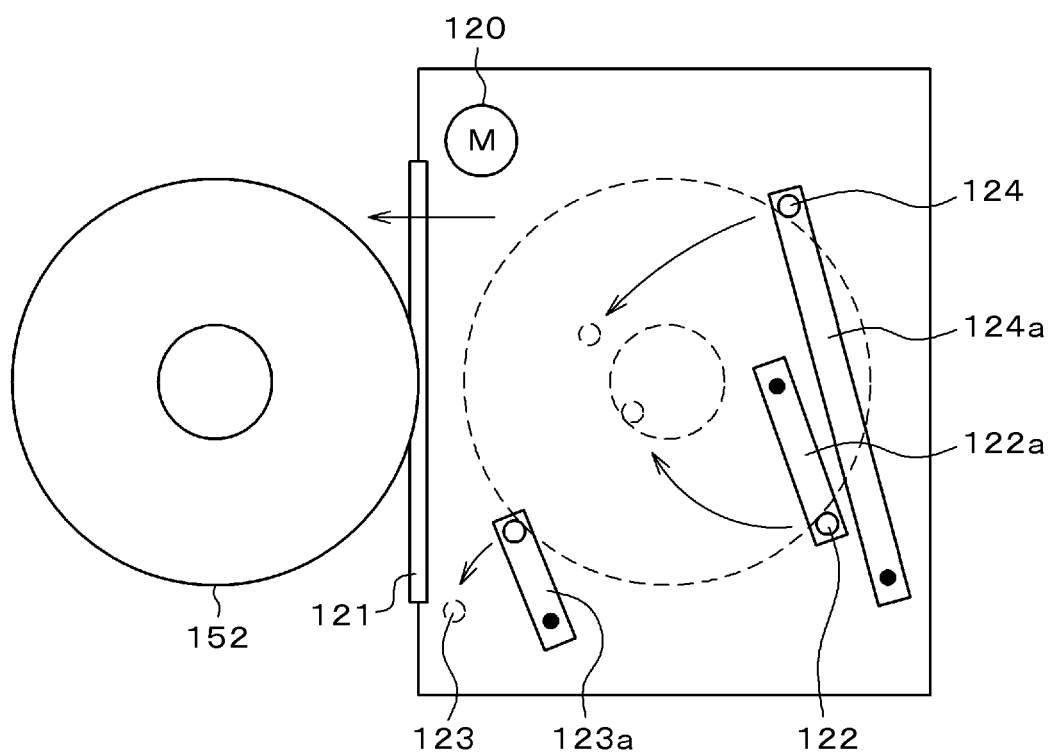
FIG. 4 is a plan view showing the operation of removing the optical disc from the ODD according to an embodiment of the present invention.

The load switch generates a logical signal (hereinafter referred to as a load signal) to indicate that the disc 152 is inserted into the ODD. When the insertion of the disc is detected, for example, the polarity of the load signal is turned ON from OFF. In response to the turn ON of the load signal, for example, the loading motor 120 is activated. When the disc 152 is removed as shown in FIG. 4 below, the load signal is naturally turned OFF from ON. The logical signal generated by the play switch is used for finely adjusting the position of the disc 152, which is not involved very much in the present embodiment and the description thereof will be omitted here.

FIG. 4 is a plan view showing the operation of ejecting the optical disc 152 from the ODD according to an embodiment of the present invention. Similarly to FIG. 3, FIG. 4 shows an example of performing slim slot disc loading. When the disc transport controller 11 instructs to eject the disc 152 from the ODD, the disc lever 122a, the insert arm 123a, and the eject arm 124a are moved. Thus, the disc roller 122, the insert roller 123, and the eject roller 124 are moved as shown in the arrow in the figure, and reach the position indicated by the dashed line. In this way, mainly the eject roller 124 ejects the disc 152 from the slot 121 to the outside.

At this time, the polarity of the load signal generated by the load switch is turned OFF from ON. The polarity of the eject signal generated by the eject switch after the generation of the load signal is switched, for example, from OFF to ON to inform the disc transport controller 11 of the completion of the eject operation. Note that the eject arm 124a is returned to the position indicated by the solid line in FIG. 4 when a predetermine time passed after the completion of the eject operation. Thus, the polarity of the eject signal is returned to the OFF state from the ON state. The logical signal generated by the play switch is used for finely adjusting the position of the disc 152 also in the eject operation, but the description thereof will be omitted for the same reason as described above.

The next describes the operation when the disc 152 is moved from the ODD of the disc recording/reproducing unit 12 to the optical disc transport unit 13, or from the optical disc transport unit 13 to the ODD.

Figure 5:
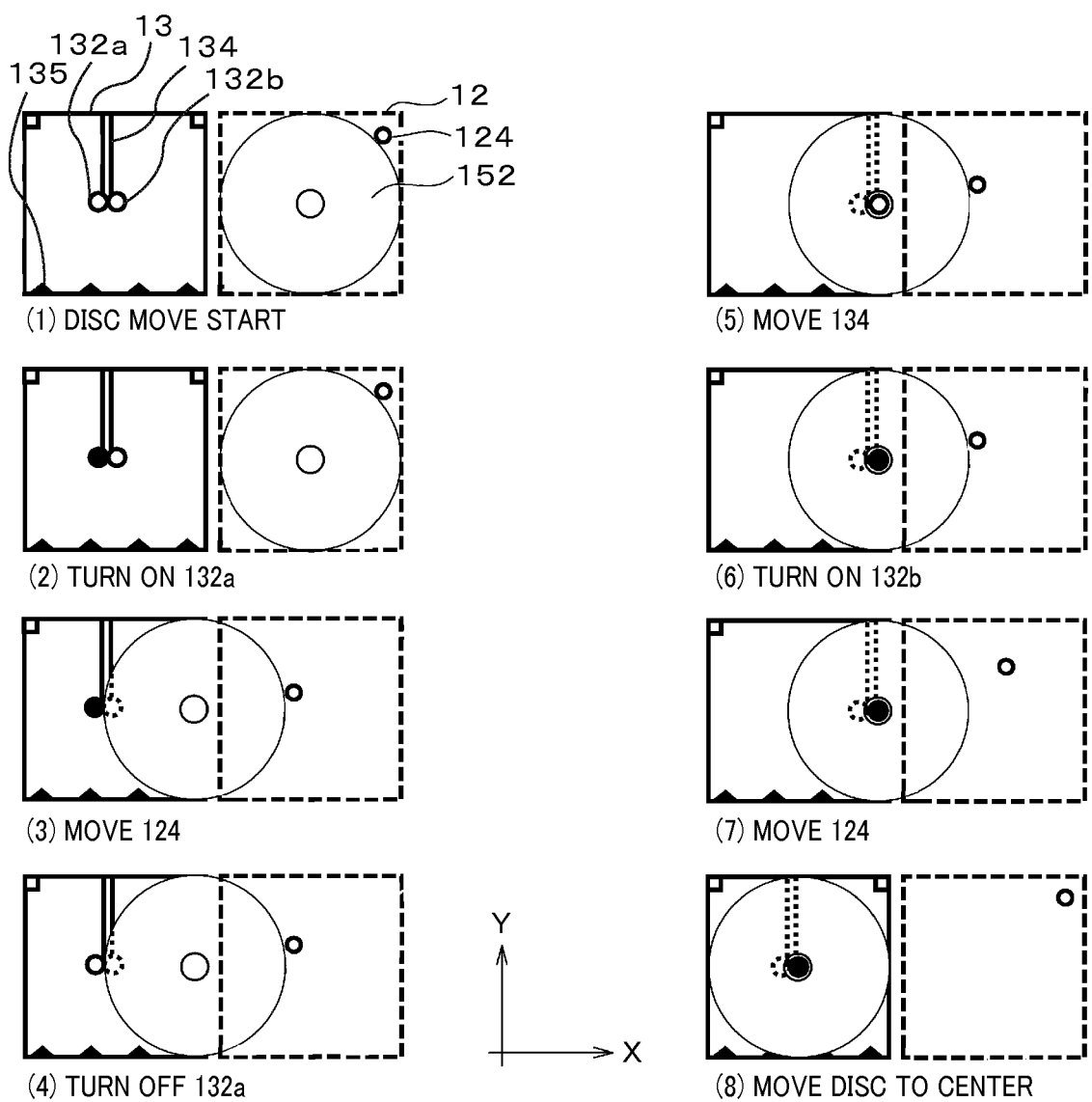
FIG. 5 is a cross-sectional view showing the operation of moving the optical disc from the ODD to the optical disc transport unit according to an embodiment of the present invention.

FIG. 5 is a cross-sectional view showing the operation of ejecting the optical disc 152 from the ODD of the disc recording/reproducing unit 12, and moving the optical disc 152 to the optical disc transport unit 13 according to an embodiment of the present invention. The operational state changes in numerical order starting from the state shown in (1) to the move completion state shown in (8). In order to avoid confusion in the figure, the reference numerals are given only in the state of (1). Further, different from FIGS. 3 and 4, it is shown only the eject roller 124 of the rollers provided in the ODD.

First, in (1), the operation of moving the disc 152, which is stored in the ODD, to the disc transport unit 13 is started. The second disc move parts 132a and 132b are both in the OFF state.

Next, in (2), one of the second disc move parts 132, 132a, which is on the negative side on the X axis, operates and moves forward in the figure. In other words, the disc transport controller 11 tunes on the second disc move part 132a.

Next, in (3), the eject roller 124 pushes the outer peripheral portion of the disc 152 to press the disc 152 into the disc transport unit 13 until the opposite outer peripheral portion is brought into contact with the second disc move part 132a that is turned ON in (2).

Next, in (4), the disc transport controller 11 turns OFF the disc move part 132a.

Next, in (5), the arm 134 is moved to the positive direction of the X axis, so that the disc move part 132b is moved to the position facing the center hole of the disc 152.

Next, in (6), the disc transport controller 11 turns ON the disc move part 132b to insert into the center hole of the disc 152.

Next, in (7), the eject roller 124 is moved back to the original position.

Finally, in (8), the arm 134 is moved to the negative direction of the X axis, so that the disc 152 is moved to the center of the disc transport unit 13. Then, the operation is completed.

The position on the negative side in the X axis direction is more appropriate for the second disc move part 132 in (3) than for the second disc move part 132b in (8). Thus, by providing two second disc move parts 132, 132a and 132b, it is enough for the disc transport unit 13 to have one position sensor (not shown) to determine the position of the arm 134 in (1) to (4) and in (8).

Note that a projection 135 is formed on the inside bottom surface of the disc transport unit 13 to position the disc 152.

FIG. 6 is a cross-sectional view showing the operation of moving the disc 152 from the optical disc transport unit 13 to the ODD and loading the disc 152 into the ODD.

First, in (1), the operation of moving the disc 152 within the disc transport unit 13 to one slit which is selected by the disc transport controller 11 as described above, is started in the ODD of the disc recording/reproducing unit 12. The second disc move part 132a, which is in the ON state, is inserted into the center hole of the disc 152. At this time, the second disc move part 132b is in the OFF state.

Next, in (2), the arm 134 is moved to the positive direction of the X axis, so that the second disc move part 132a moves the disc 152 to locate a part of the disc 152 on the outside of the disc transport unit 13.

Next, in (3), the disc transport controller 11 turns OFF the second disc move part 132a.

Next, in (4), the arm 134 is moved to the negative direction of the X axis to reach in the vicinity of the end on the left side of the disc transport unit 13 in the figure.

Next, in (5), the disc transport controller 11 turns ON the second disc move part 132b.

Next, in (6), the arm 134 is moved to the positive direction of the X axis to push the disc 152 to the inside of the ODD of the disc recording/reproducing unit 12. At this time, the loading motor 120 of the ODD shown in FIG. 3 also functions to load the disc 152 into the ODD.

Next, in (7), the arm 134 is moved to the negative direction of the X axis to the position shown in (1) of FIG. 5.

Finally, in (8), the disc transport controller 11 turns OFF the second disc move part 132b. Then, the operation is completed.

Next, errors that occur in the operation of transporting the disc 152 will be described. Here, the description will focus on errors in the movement of the disc 152 from the ODD to the disc transport unit 13. In this case, different from the case in which the disc 152 is moved from the disc transport unit 13 to the ODD, or from the disc transport unit 13 to the disc container 15, or from the disc container 15 to the disc transport unit 13, the disc transport controller 11 transmits a control signal to both the disc transport unit 13 and the ODD, so that the control is likely to be complicated. Thus, it is the most important to take measures to prevent errors involving the movement of the disc 152 from the ODD to the disc transport unit 13.

FIG. 7 is a view showing the state in which the disc 152 is moved from the ODD to the disc transport unit 13 according to an embodiment of the present invention. FIG. 7 shows the state of the disc in eight typical cases, the error detected by the ODD in each case (hereinafter referred to as the ODD error) as well as the error detected by the disc transport unit 13 (hereinafter referred to as the carrier error), and the result of the recovery determination performed by the disc transport controller 11 according to the state and error in each case. If the result of the recovery determination is positive (the recovery is possible), the operation of moving the disc 152 from the ODD to the disc transport unit 13 is performed again.

Note that FIG. 7 is also a cross-sectional view showing the position of the center hole of the disc 152 in the XZ plane. All of the eight cases may occur not only when the disc 152 is moved immediately after the command to eject the disc 152 from the ODD, but also when an error occurs in the disc movement and the disc 152 is moved again from the ODD. For example, there may be the case in which the error of case 6 occurs in the first attempt of the movement, the error of case 3 occurs in the second attempt of the movement, case 1 occurs in the third attempt of the movement, and then the operation is completed.

Each of the cases shown in FIG. 7 will be described below.

Case 1 is a case in which the disc 152 is moved from the ODD to the position of the disc transport unit 13 shown in the figure and in which neither the ODD error nor the carrier error occurs. In other words, this corresponds to the states of (5) to (7) in FIG. 5. Then, the disc 152 is guided to the second disc move part 132b and is inserted into the disc transport unit 13.

In this way, a given operation can be completed. (This corresponds to Step S26 in the operation flow chart of FIG. 8B described below.)

Of course, there is no need to perform again the disc movement and there is no need for the disc transport controller 11 to perform the recovery determination.

Case 2 is a case in which the disc 152 is ejected from the ODD at the position apart from the disc transport unit 13 because the relative positions of the ODD and the disc transport unit 13 are largely displaced. In this case, the eject signal generated by the switch of the eject lever 124a, for example, shown in FIG. 4, has been switched. Thus, the ODD determines that the ejection is completed as planned and does not generate the ODD error.

On the other hand, the disc transport unit 13 has a disc detector for detecting whether the disc 152 is present inside the disc transport unit 13 (including the information about the insertion amount if it is present).

In Case 2, although the disc 152 is ejected from the ODD, the disc detector does not detect the disc 152, so that the disc transport unit 13 generates the carrier error to inform the disc transport controller 11 of the problem. However, as can be found from the operation of the individual components as well as the position of the disc 152 shown in FIGS. 3 to 6, it is difficult to pull in the disc 152 both from the ODD and the disc transport unit 13. Thus, the disc transport controller 11 outputs a recover determination of the fact that the recovery may not be possible to inform the user of this fact. The library system 1 does not perform further recovery and waits for manual recovery by the user. (This corresponds to Step S1304 in FIG. 10.)

Case 3 is a case in which the disc 152 is not fully inserted into the disc transport unit 13 due to friction or other factors, although there is no particular problem in the relative positions of the ODD and the disc transport unit 13. For example, as shown in the figure, when the disc 152 comes to a stop with its center between the ODD and the disc transport unit 13, the eject signal generated by the switch of the eject lever 124a, for example, shown in FIG. 4, has been switched. Thus, the ODD determines that the ejection is completed as planned and does not generate the ODD error. On the other hand, the disc detector of the disc transport unit 13 detects the insertion of the disc 152 when the eject signal is switched.

In Case 3, the disc transport unit 13 generates the carrier error to inform the disc transport controller 11 of the lack of the disc insertion. However, as can be found from the position of the disc 152, the situation does not allow the load switch of the disc lever 122a of the ODD to be turned ON, so that it is difficult to pull in the disc 152 again only by the operation of the ODD. Further, the second disc move part 132a of the disc transport unit 13 is not able to enter the center hole of the disc 152, so that the disc transport unit 13 may not pull in the disc 152.

However, when the disc transport unit 13 inserts the disc 152 into the ODD again by the operation shown in (5) and (6) in FIG. 6, it is possible to perform the operation of moving the disc 152 from the beginning. Thus, the disc transport controller 11 outputs the recovery determination of the fact that the recovery is possible. In response to this recover determination, the disc transport unit 13 inserts the disc 152 into the ODD, and the both perform the operation of moving the disc 152 from the ODD to the disc transport unit 13 from the beginning.

The reason why the disc 152 is not fully inserted into the disc transport unit 13 is that the position of the disc transport unit 13 with respect to the slot of the ODD is not appropriate. Thus, it is preferable to perform jog movement to slightly change the relationship between the relative positions of the ODD and the optical disc transport unit 13. (This corresponds to Step S1311 in FIG. 10.)

Case 4 is a case in which, for example, a part of the disc 152 protrudes from the ODD, so that the disc 152 is brought into contact with the outside (the XY plane in FIG. 1) of the disc transport unit 13 when the disc transport unit 13 moves the disc 152 to the disc container 15 or performs the jog movement. As shown in the figure, this case can occur not only when the movement of the disc 152 from the ODD to the disc transport unit 13 is successful and disc 152 is transported to the disc container 15, but also when the movement of the disc 152 is unsuccessful and the jog movement is performed. In this case, the eject signal generated by the switch of the eject lever 124a, for example, shown in FIG. 4, has been switched. Thus, the ODD determines that the ejection is completed as planned, so that the ODD error is not detected.

On the other hand, the disc transport unit 13 has an external disc detector for detecting the fact that the disc 152 comes into contact with the XY plane outside.

In Case 4, the external disc detector detects the disc 152, so that the carrier error is generated to inform the disc transport controller 11 of the abnormality detection. Thus, the disc transport controller 11 outputs a recover determination of the fact that the recovery may not be possible to inform the user of this fact. The library system 1 does not perform further recovery and waits for manual recovery by the user. (This corresponds to Step S1309 in FIG. 10.)

Note that because the disc 152 protrudes from the disc container 15 in Case 4, this is the same as the case in which the disc transport unit 13 is brought into contact with the disc 152, thus being able to use the same embodiment for the error detection and process in Case 4.

Case 5 is a case in which although there is no significant problem in the relative positions of the ODD and the disc transport unit 13, the disc 152 is not fully inserted into the disc transport unit 13 due to friction or other factors. However, Case 5 is different from Case 3 in that the disc 152 may be pulled into the disc transport unit 13 by slightly changing the position of the second disc move part 132b of the disc transport unit 13 in the steps shown in (5) and (6) in FIG. 5.

For example, as shown in the figure, when the disc 152 comes to a stop with its center at the inlet of the disc transport unit 13, the eject signal generated by the switch of the eject lever 124a, for example, shown in FIG. 4, has been switched. Thus, the ODD determines that the ejection is completed as planned and does not generate the ODD error.

On the other hand, when the operation shown in (5) and (6) in FIG. 5 is performed to pull in the disc 152 and the operation is unsuccessful, the disc transport unit 13 performs the operation shown in (5) and (6) in FIG. 5 by slightly changing the position of the second disc move part 132b, until the number of retries reaches a predetermined number of times (for example, 10), in order to pull the disc 152 into the disc transport unit 13. When the disc 152 is successfully pulled into the disc transport unit 13 before the number of executions reaches the predetermined number of times, the operation is completed. (This corresponds to Step S26 in FIG. 8B.)

When the operation of pulling in the disc 152 is unsuccessful even if the operation has been performed the predetermined number of times, the disc transport unit 13 generates the carrier error to inform the disc transport controller 11 of the excess in the number of times of loading. Similarly to Case 3, as can be found from the position of the disc 152, it is difficult to pull in the disc 152 again only by the operation of the ODD. On the other hand, when the disc transport unit 13 performs the operation shown in (5) and (6) in FIG. 6 to insert the disc 152 into the ODD again, it is possible to perform the operation of moving the disc 152 from the beginning. Thus, the disc transport controller 11 outputs the recovery determination of the fact that the recovery is possible. In response to the recovery determination, the disc transport unit 13 inserts the disc 152 into the ODD. (This corresponds to Step S1318 in FIG. 10.)

Then, the both perform the operation of moving the disc 152 from the ODD to the disc transport unit 13 from the beginning. At this time, if the situation of Case 5 occurs again, the disc transport unit 13 performs the operation shown in (5) and (6) in FIG. 5 by slightly changing the position of the second disc move part 132b until the number of retries reaches the predetermined number of times. In this way, the disc transport unit 13 tries to pull the disc 152 into the disc transport unit 13. However, when the disc 152 is not pulled in even if the operation has been performed the predetermined number of times, it may be little worth trying this operation again. Thus, the disc transport controller 11 outputs the recovery determination of the fact that the recovery may not be possible to inform the user of this fact. The library system 1 does not perform further recovery and waits for manual recovery by the user. (This corresponds to Step S23 in FIG. 8B.)

Case 6 is a case in which the outer periphery of the disc 152 collides against the outside (the YZ plane in FIG. 1) of the disc transport unit 13 because the relative positions of the ODD and the disc transport unit 13 are slightly displaced. In this case, the eject signal generated by the switch of the eject lever 124a and the load signal generated by the switch of the disc lever, for example, both shown in FIG. 4, are not switched. The ODD back pushes the disc 152 by its operation and is ready to load the disc 152 again. This is called back push state. When predetermined time has passed after the command to move the disc 152 has been given by the disc transport controller 11, the ODD goes to the back push state. Then, the ODD informs the disc transport controller 11 of this state. Under the circumstances in which the disc 152 is not ejected from the ODD, it is natural that the disc 152 inside is not detected. Thus, the disc transport unit 13 informs the disc transport controller 11 of the fact that there is not carrier error. In this case, the ODD inserts the disc 152 again by its operation. Then, the jog movement is performed to slightly change the relationship between the relative positions of the ODD and the disc transport unit 13, to the desired position relationship. In this way, it is possible to perform the operation of moving the disc 152 from the beginning. (This corresponds to Step 1408 in FIG. 11.)

Case 7 is a case in which a small part of the disc surface of the disc 152 is brought into contact with the vicinity of the disc inlet of the disc transport unit 13 (the XY plane in FIG. 1), because the relative positions of the ODD and the disc transport unit 13 are slightly displaced. In this case, similar to Case 6, the ODD informs the disc transport controller 11 of the ODD state called back push. However, even if the ODD back pushes the disc 152 by its operation, it is difficult to load the disc 152 again due to friction.

If the disc 152 has been returned to the ODD by the back push, the disc detector of the disc transport unit 13 would not detect the disc 152. However, the disc 152 is actually detected with a small amount of insertion. Thus, the disc transport unit 13 informs the disc transport controller 11 of the fact that the disc is detected. However, even if the disc transport unit 13 tries to return the disc 152 to the ODD, circumstances do not allow the disc 152 to be returned in the same manner.

In such a case, if the jog movement is performed to slightly change the relationship between the relative positions of the ODD and the optical disc transport unit 13 in the same way as in Case 6, the surface of the disc 152 may be damaged. Further, if the ODD or the disc transport unit 13 forcibly moves the disc 152, the surface of the disc 152 may also be damaged. Thus, the disc transport controller 11 outputs the recovery determination of the fact that the recovery may not be possible to inform the user of this fact. The library system 1 does not perform further recovery and waits for manual recovery by the user. (This corresponds to Step 1404 in FIG. 11 and is completed in S17 in FIG. 8B.)

Case 8 is a case in which a small part of the disc surface of the disc 152 is brought into contact with the outside of the disc transport unit 13 (the XY plane in FIG. 1). In this case, similarly to Cases 6 and 7, the ODD informs the disc transport controller 11 of the ODD state called back push. However, even if the ODD back pushes the disc 152 by its operation, it is difficult to load the disc 152 again due to friction.

Further, similarly to Case 4, the disc transport unit 13 generates the carrier error to inform the disc transport controller 11 that an abnormality is detected in the disc position. In this case also, the surface of the disc 152 may be damaged if the jog movement is performed. Further, the surface of the disc 152 may also be damaged if the ODD forcibly pulls the disc 152 into the ODD. Thus, the disc transport controller 11 outputs the recovery determination of the fact that the recovery may not be possible to inform the user of this fact. The library system 1 does not perform further recovery and waits for manual recovery by the user. (This corresponds to Step S1404 in FIG. 11, and the operation is completed in S17 of FIG. 8B.)

As described above, in the present embodiment, when the problem shown in Cases 2 to 8 occurs, in particular, as shown in Cases 2, 4, 7, 8, when the library system 1 may not perform the recovery by its operation or when there is a risk that the disc 152 is damaged due to the recovery, the library system 1 outputs the recovery determination of the fact that the recovery may not be possible, so as in particular to prevent performing the jog movement.

Further, when the library system 1 is expected to be able to recover by its operation in the same way as in Cases 3 and 6, the library system 1 outputs the recovery determination of the fact that the recovery is possible. In response to this, the operation of moving the disc 152 to the disc transport unit 13 is performed again once the disc 152 is inserted into the ODD again. At this time, the jog movement is performed.

Further, also in Case 5, the library system 1 is expected to be able to recover by its operation, so that the disc transport unit 13 first pulls in the disc 152. Upon failure of the operation of pulling the disc 152 into the disc transport unit 13, the disc transport unit 13 inserts the disc 152 into the ODD again. Then, the operation of moving the disc 152 to the disc transport unit 13 is performed again.

These determinations are made based not only on the error detected in the disc transport unit 13 but also on the error detected in the ODD of the disc recording/reproducing unit 12.

Thus, it is possible to provide the library system 1 with high reliability without the problem of damage to the disc 152 when the disc 152 is moved.

Next, the flow chart of the operation of moving the disc 152 will be described. At the same time, the position of each of Cases 1 to 8 in the flow chart will be clarified.

Figure 8A:
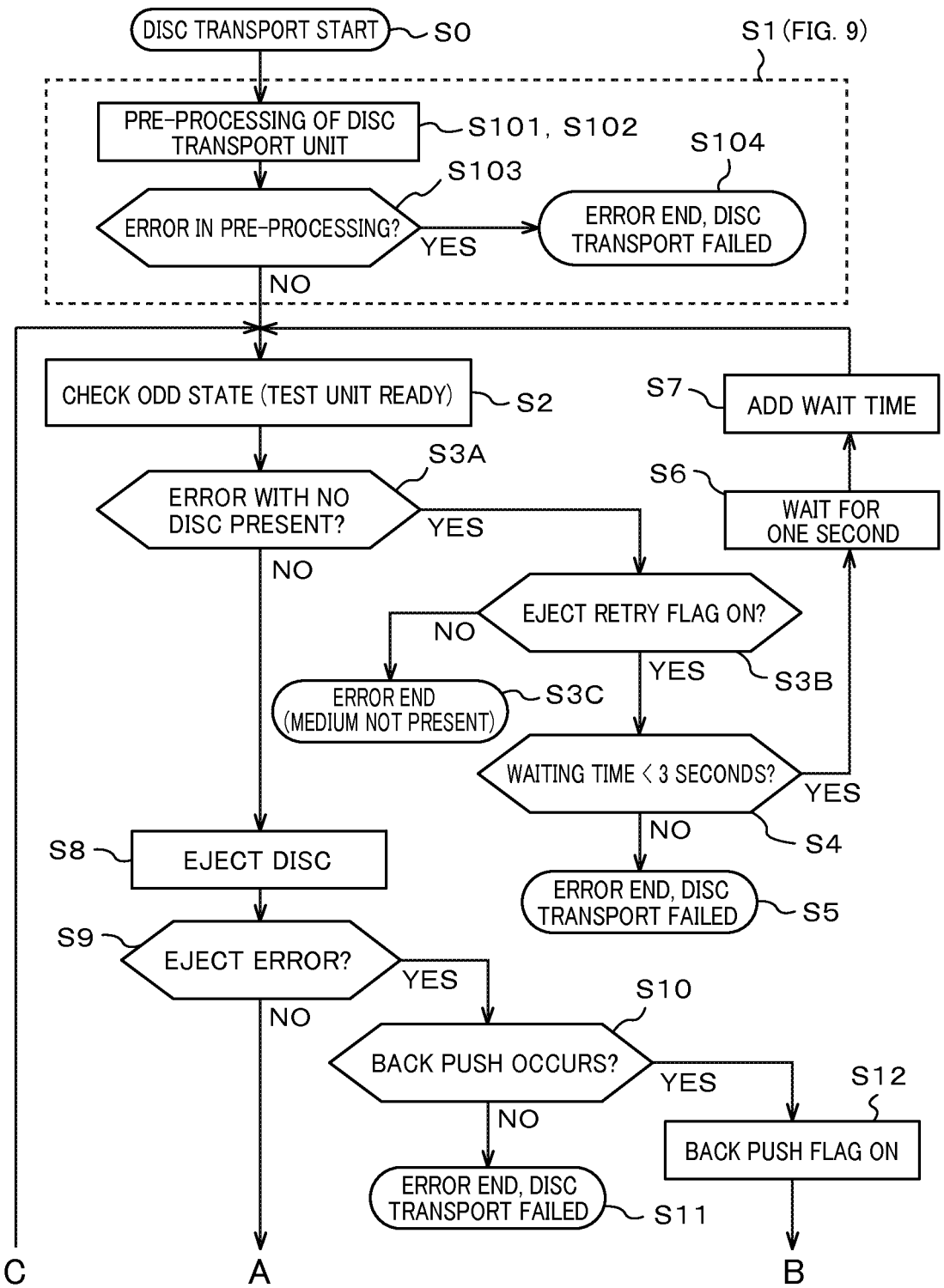
FIG. 8A is a flow chart of the operation of transporting the disc from the ODD of a disc recording/reproducing unit, to the disc container, or to the ODD according to an embodiment of the present invention (first half)
Figure 8B:
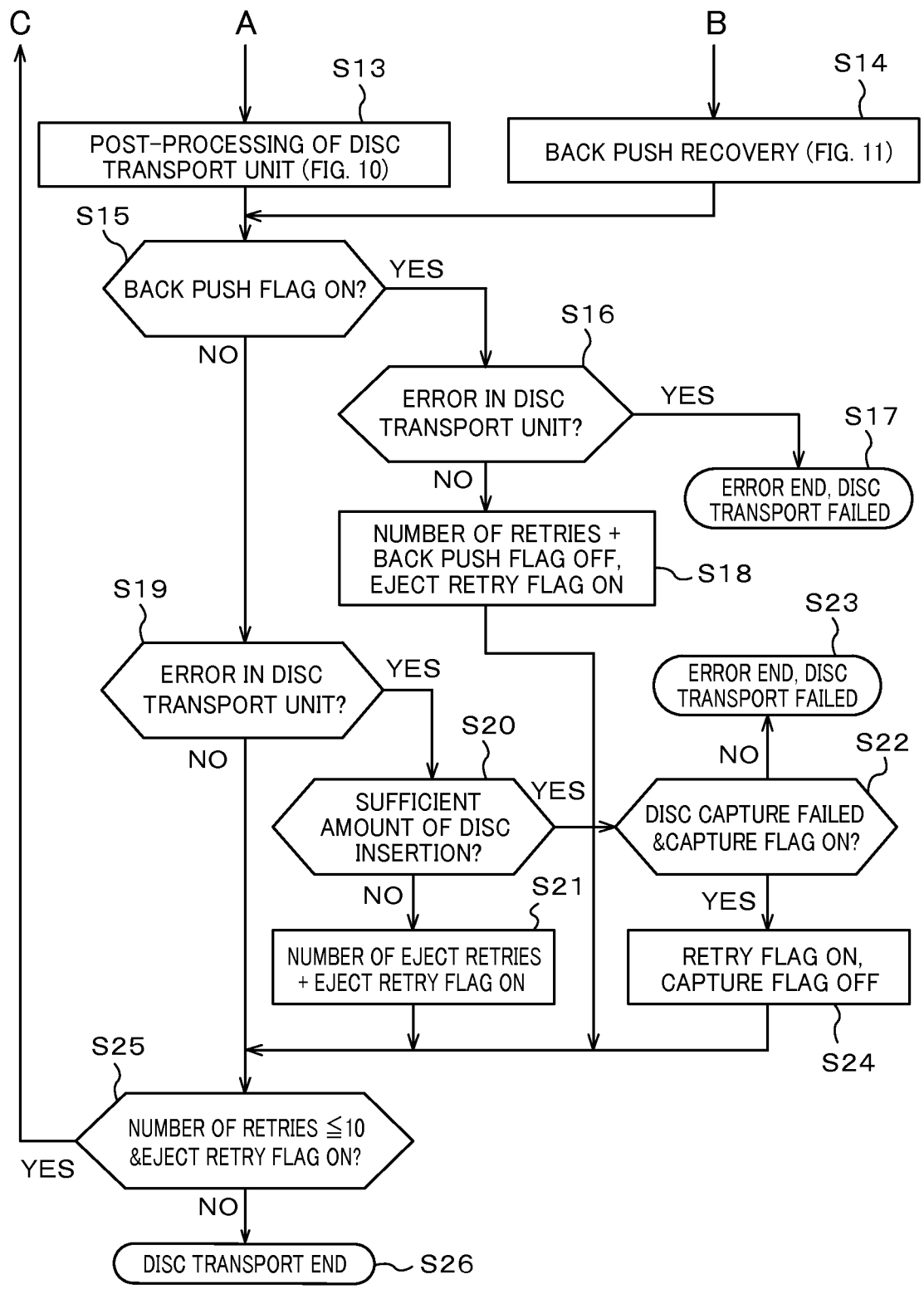
FIG. 8B is a flow chart of the operation of transporting the disc from the ODD of the disc recording/reproducing units, to the disc container, or to the ODD according to an embodiment of the present invention (latter half)

FIGS. 8A and 8B are flow charts of the operation of transporting the disc from the ODD of the disc recording/reproducing unit to the disc container, or to the ODD according to an embodiment of the present invention. FIGS. 8A and 8B constitute the entire operation flow chart. Here, however, the flow chart is divided into two parts for the convenience of display. Further, of the steps included in FIGS. 8A and 8B, three steps are described in detail in the operation flow charts shown in FIGS. 9 to 11.

In FIG. 8A, the disc transport controller 11 starts the operation of moving the disc 152 from the ODD of the disc recording/reproducing unit 12 to the disc transport unit 13 in Step S0 (hereinafter simply referred to as S0, instead of displaying Step S0).

Figure 9:
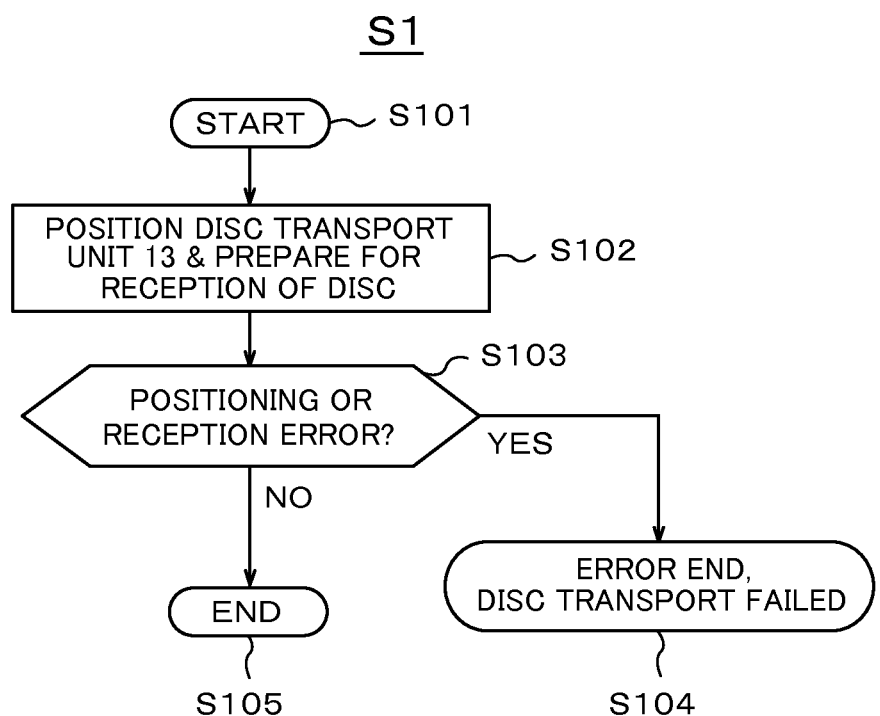
FIG. 9 is a flow chart of the operation of the pre-processing of the disc transport unit in FIG. 8A.

Next, the pre-processing of the disc transport unit 13, which will be described in detail with reference to FIG. 9, is performed in S1. Note that S101 to S104 in FIG. 8A correspond to the steps with the same numbers in FIG. 9.

FIG. 9 is an operation flow chart of the pre-processing S1 of the disc transport unit 13 in FIG. 8A. The disc transport controller 11 starts the pre-processing in S101.

In response to the start of the pre-processing, in S102, the disc transport unit 13 moves to the position opposite the ODD of the specified disc recording/reproducing unit 12 based on the command of the disc transport controller 11. Further, the disc transport unit 13 locates the arm 134, for example, at the position shown in (1) in FIG. 5, turns ON the second disc move part 132a to prepare for receiving the disc 152, and informs the disc transport controller 11 of the result.

In response to the result, in S103, the disc transport controller 11 determines whether an error occurs in the positioning and the receiving preparation. If an error occurs (yes in the figure), it is difficult to continue the operation, so that the disc transport controller 11 informs the user of the error and ends the operation in S104. If no error occurs (no in the figure), the disc transport controller 11 ends the process in S105 and proceeds to S2 in FIG. 8A.

Next returning to FIG. 8A, in S2, the disc carrier controller 11 checks the state of the ODD of the disc recording/reproducing unit 12 according to the operation flow shown in S3A to S7. This is a new process added in the present embodiment.

In S3A, the disc transport controller 11 determines whether the ODD is an error with no disc present. If the result of the determination in S3A is yes, the process proceeds to S3B, and if no, the process proceeds to S8.

When the determination in S3A is yes, this means that the disc 152 is not originally inserted into the ODD in the move operation of the disc 152, or that the ODD has not started the operation of recognizing the disc 152.

Next, in S3B, the disc transport controller 11 determines whether the eject retry flag is ON. If the result of the determination in S3B is yes, the process proceeds to S4, and if no, the process proceeds to S3C.

The eject retry flag is a flag that is turned ON when the move operation (eject operation) of the disc 152 from the ODD is performed again as in Cases 3, 5, and 6. For example, the flow returning to S2 from C shown in the lower left of FIG. 8A corresponds to these cases. At this time, the flag is ON. The flag ON corresponds to the case in which the ODD has not started the operation of recognizing the disc 152, so that the disc transport controller 11 proceeds to S4. The flag OFF corresponds to the case in which the disc 152 is not originally inserted into the ODD, so that the disc transport controller 11 informs the user of the error (Medium Not Present) and ends the operation in S3C.

Even if the disc 152 is loaded into the ODD and the load switch is switched, it still takes, for example, about one second until the ODD starts the recognition operation of the disc 152. During this time, the ODD generates an error signal indicating that the disc is not present. Then, when the recognition operation is started, the ODD generates a control signal indicating that the disc is being recognized, replacing the control signal indicating that the disc is not present.

Thus, in S4 to S7 and in S2, the disc transport controller 11 checks the state of the ODD (S2) at regular intervals in a sufficient period of time from when the load switch is switched to when the control signal indicating that the disc is being recognized is generated.

If the sufficient time (for example, 3 seconds) has passed in S4 (no in the figure), it is considered that the ODD may not start the operation of recognizing the disc 152 due to a certain failure. Thus, the disc transport controller 11 proceeds to S5. The disc transport controller 11 informs the user of the error and ends the operation. If the sufficient time (for example, 3 seconds) has not passed (yes in the figure), the disc transport controller 11 waits, for example, for one second in S6. Then, in S7, the disc transport controller 11 adds the time waited in S6 to the waiting time. Then, the process returns to S2. If the ODD starts the recognition operation of the disc 152 within 3 seconds, the determination of S3A is no, and the process proceeds to the next S8.

By using the steps S3A, S3B, and S4 to S7, it is possible to avoid the inconvenience caused by the situation in which the disc 152 is not normally loaded into the ODD and is ejected by the ODD which is not able to start the recognition operation.

Next, in S8, in order to move the disc 152 from the ODD of the disc recording/reproducing unit 12 to the disc transport unit 13, the disc 152 is ejected from the ODD and the result is reported to the disc transport controller 11. For example, whether an error occurs in the eject operation is determined, by the polarity of the control signal generated by the eject switch of the eject arm 124a, for example, shown in FIG. 4. The polarity of the particular control signal is turned ON from OFF when the disc 152 is ejected from the ODD by a predetermined amount. Thus, if the eject switch is not turned ON from OFF within a predetermined time, it is determined that the eject operation is an error.

Next, in S9, the disc transport controller 11 determines the eject result performed in S8. If there is no error in the eject operation (no in the figure), the process proceeds from (A) in FIG. 8A to the next S13 in FIG. 8B. This corresponds to one of Cases 1 to 5 in FIG. 7. If there is an error in the eject operation (yes in the figure), the process proceeds to S10.

Next, in S10, the disc transport controller 11 determines whether the back push of the ODD occurs in response to the error of the eject operation. The back push is the operation of the ODD that is performed according to the polarity of the control signal generated by the load switch of the disc lever 122a shown in FIG. 4. When the ODD loads the disc 152, the control signal generated by the load switch is turned ON from OFF when the disc 152 is inserted into the ODD by a predetermined amount. On the other hand, when the ODD ejects the disc 152, the control signal generated by the load switch is turned OFF from ON before the polarity of the control signal generated by the eject switch is turned ON from OFF.

When the eject operation has not been completed within a predetermined time and the control signal generated by the load switch is ON, or when the control signal is once tuned OFF and turned ON again, the ODD functions to load the disc 152 again. This operation is called back push.

In S10, when the disc transport controller 11 determines that the ODD is in the back push state (yes in the figure), the process proceeds to S12 to turn ON the back push flag. Then, the process proceeds to S14 in FIG. 8B from (B) in FIG. 8A. This corresponds to one of Cases 6 to 8 in FIG. 7. When the disc transport controller 11 determines that the ODD is not in the back push state (no in the figure), this is an abnormal state in which the ODD may not eject or load the disc 152 again. Thus, the process proceeds to S11 to inform the user of a time out error, and ends the operation flow.

By using the steps S8 to S12, it is possible to separate the flow in which the back push occurs in the ODD, from the others. Further, it is also possible to prevent the continuation of the operation in the abnormal state. As a result, it is possible to improve the reliability of the operation as described below. This is a new process added in the present embodiment.

Next, the operation flow chart shown in FIG. 8B will be described. When the result of the determination is no in S9 in FIG. 8A, the process proceeds to S13 in FIG. 8B. This corresponds to one of Cases 1 to 5 in FIG. 7. Further, the flow through S12 of FIG. 8A proceeds to S14 of FIG. 8B. This corresponds to one of Cases 6 to 8 in FIG. 7.

First, the post processing in the disc transport unit 13 shown in S13 will be described. The details of the post-processing will be described with reference to FIG. 10.

Figure 10:
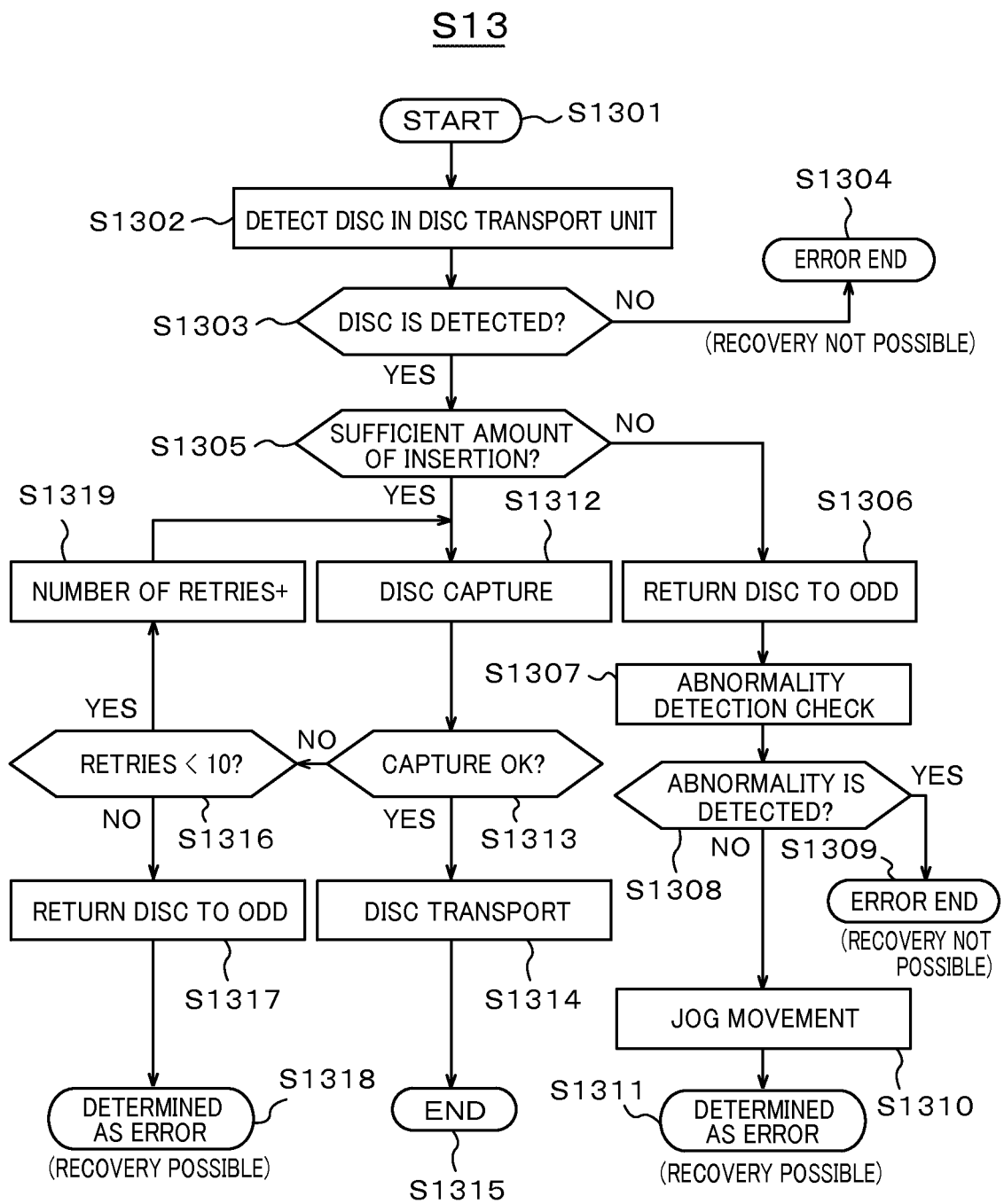
FIG. 10 is a flow chart of the operation of the post-processing of the disc transport unit in FIG. 8B.

FIG. 10 is an operation flow chart of the post processing S13 of the disc transport unit 13 in FIG. 8B. The operation flow is started in S1301.

In S1302, the disc transport unit 13 detects whether the disc 152 is present inside the disc transport unit 13 by the disc detector.

In S1303, the disc transport controller 11 determines whether the disc transport unit 13 detects the disc 152. As a result of the determination in S1303, if the disc 152 is not detected (no in the figure), the process proceeds to S1304. This can be considered to be the state shown in Case 2 of FIG. 7. Thus, in S1304, the disc transport controller 11 determines that the recovery may not be possible as described above, and ends the operation in the error state.

As a result of the determination in S1303, if the disc 152 is detected (yes in the figure), the process proceeds to S1305. This can be considered to be the state shown in Cases 1 and 3 to 5 of FIG. 7. Thus, in S1305, the disc transport controller 11 determines whether the insertion of the disc 152 into the disc transport unit 13 is sufficient, based on the information about the disc 152 detected by the disc transport unit 13.

As a result of the determination in S1305, if it is determined that the insertion of the disc 152 into the disc transport unit 13 is not sufficient (no in the figure), the process proceeds to S1306. This can be considered to be the state shown in Case 3 of FIG. 7. Further, not only Case 3 but also Case 4 may occur simultaneously. Thus, in S1306, the disc transport unit 13 first returns the disc 152 to the ODD. Further, in order to determine whether Case 4 occurs, the disc transport controller 11 performs the abnormality detection check by the external disc detector in S1307. Based on the result of the abnormality detection check, the disc transport controller 11 determines whether the abnormality detection is present.

As a result of the determination in S1308, if it is determined that the abnormality detection is present (yes in the figure), it can be considered that Case 4 occurs. Thus, the process proceeds to S1309. The disc transport controller 11 determines that the recovery may not be possible and ends the operation in the error state. As a result of the determination in S1308, if it is determined that the abnormality detection is not present (no in the figure), the process proceeds to S1310. In this case, it can be considered that Case 3 occurs but Case 4 does not occur, so that there is no problem if the jog movement is performed. Thus, the jog movement is performed in S1310 to slightly change the relationship between the relative positions of the ODD and the disc transport unit 13. Then, the process proceeds to S1311 to prepare for retry although the error occurs.

As a result of the determination in S1305, if it is determined that the insertion of the disc 152 into the disc transport unit 13 is sufficient (yes in the figure), the process proceeds to S1312. This can be considered to be the state shown in Cases 1 and 5 in FIG. 7.

In S1312, the disc transport unit 13 performs the operation shown in (5) to (8) in FIG. 5 to try to pull (capture) the disc 152 into the disc transport unit 13. Then, the process proceeds to S1313. In S1313, the disc transport controller 11 determines whether the capture of the disc 152 is successful.

As a result of the determination in S1313, if the capture is successful (yes in the figure), the process proceeds to S1314. Typically the capture is successful in the first attempt in Case 1. However, sometimes the capture is successful in the first attempt also in Case 5. In S1314, the disc 152 captured into the disc transport unit 13 is transported to the disc container 15. Then, the process proceeds to S1315 and ends the flow shown in FIG. 10.

Note that when the disc 152 is transported in S1314, it is also possible to determine whether Case 4 occurs by the steps shown in S1307 to S1309 and end the operation if Case 4 occurs, although illustration is omitted to avoid confusion in the figure.

As a result of the determination in S1313, if the capture is unsuccessful (no in the figure), the process proceeds to S1316 to retry the capture. In Case 5, there is a possibility that the capture may be successful if the position of the second disc move part 132b is slightly moved. Thus, the disc transport unit 13 repeats the capture operation for a predetermined times as the upper limit. Here, if the upper limit is set to 10, the disc transport controller 11 determines whether the number of retries of the capture operation is less than 10 in S1316.

As a result of the determination in S1316, if the number of retries is less than 10 (yes in the figure), the process proceeds to S1319 to increment the flag of the retry number by one. Then, the process returns to S1312 to continue to retry the capture. As a result of the determination in S1316, if the retry number is 10 (no in the figure), the process proceeds to S1317. In this case, it may be difficult to capture the disc 152 even if the second disc move part 132 is slightly moved. Thus, in S1317, the disc transport unit 13 performs the operation shown in (5) and (6) in FIG. 6 to return the disc 152 to the ODD. Then, the process proceeds to S1318 to prepare for retry although the error occurs.

Next returning to FIG. 8B, the post-processing in the disc transport unit 13 shown in S14 will be described. The details will be described with reference to FIG. 11.

FIG. 11 is an operation flow chart of the back push process of the disc transport unit 13 in FIG. 8B. This is one of the new processes in the present embodiment.

The operation flow is started in S1401. Next, in S1402 and 1403, similarly to S1302 and S1303 in FIG. 10, the disc transport unit 13 performs the detection operation of the disc 152 and determines the detection result.

As a result of the determination in S1403, if the disc 152 is detected (yes in the figure), the process proceeds to S1404. This can be considered to be the state shown in Case 7 in FIG. 7. Thus, in S1404, the disc transport controller 11 determines that the recovery may not be possible because the disc 152 may be damaged if the recovery operation is forcibly performed as described above, and ends the operation in the error state.

As a result of the determination in S1403, if the disc 152 is not detected (no in the figure), the process proceeds to S1405. This can be considered to be the state shown in Case 6 or 8 in FIG. 7.

Next, in S1405 and S1406, the external disc detector of the disc transport unit 13 performs the operation of detecting an abnormality in the disc 152 and determines the detection result as described above.

As a result of the determination in S1406, if an abnormality is detected in the disc 152, namely, if the disc 152 comes into contact with the outside of the disc transport unit 13 (yes in the figure), the process proceeds to S1404. This can be considered to be the state shown in Case 8 in FIG. 7. Thus, in S1404, the disc transport controller 11 determines that the recovery may not be possible because the disc 152 may be damaged if the recovery operation is forcibly performed as described above, and ends the operation in the error state.

As a result of the determination in S1406, if no abnormality is detected in the disc 152 (no in the figure), the process proceeds to S1407. This can be considered to be the state shown in Case 6 in FIG. 7. Unlike Cases 7 and 8, the disc 152 is loaded into the ODD again in the back push by the ODD, which is determined in S10. Thus, in S1407, the jog movement is performed to slightly change the relationship between the relative positions of the ODD and the disc transport unit 13. Then, the process proceeds to S1408 to prepare for retry although the error occurs.

Note that the abnormality detection check in S1405 and S1406 can be combined with the step of determining whether Case 4 occurs in Case 6 before the jog movement in S1407.

Returning again to FIG. 8B, the operation flow including the steps from S15 to S26 will be described. This is the operation flow for determining whether the movement of the disc 152 is retried according to the situation, based on the error detected by the ODD and on the error detected by the disc transport unit 13. This is one of the new processes in the present embodiment.

The operation flows from S1311, S1315, and S1318 in FIG. 10, as well as S1404 and S1408 in FIG. 11 are given to S15, respectively. Here, the state of the disc transport unit 13, the ODD, and the disc 152 will be described.

When the operation flow is given from S1311, the disc 152 is returned to the ODD with respect to Case 3 in FIG. 7. Then, the jog movement is performed as described above, so that the relative positions of the disc transport unit 13 and the ODD are slightly changed.

When the operation flow is given from S1315, the disc 152 is moved from the ODD to the disc transport unit 13. Thus, the operation of moving the disc 152 to the disc container 15 has been completed.

When the operation flow is given from S1318, the disc 152 is inside the ODD as shown in (8) in FIG. 6.

Thus, the operation of returning the disc 152 to the ODD has been completed.

When the operation flow is given from S1404, the state shown in Case 7 or 8 of FIG. 7 occurs, so that it is necessary to end the operation in this state in order to avoid damage to the disc 152.

When the operation flow is given from S1408, the disc 152 is returned to the ODD by the back push with respect to Case 6 in FIG. 7. Then, the jog movement is performed, so that the relative positions of the disc transport unit 13 and the ODD are slightly changed.

In S15, the disc transport controller 11 determines whether the back push flag is ON.

As a result of the determination in S15, if the back push flag is ON (yes in the figure), the process proceeds to S16. This is the case in which the operation flow is given to S15 from S1404 or S1408 in FIG. 11.

In S16, the disc transport controller 11 determines whether an error occurs in the disc transport unit 13.

As a result of the determination in S16, if an error occurs in the disc transport unit 13 (yes in the figure), this is the case in which the operation flow is given from S1404. Thus, the process proceeds to S17 and ends the operation in the error state.

As a result of the determination in S16, if no error occurs in the disc transport unit 13 (no in the figure), this is the case in which the operation flow is given from S1408, so that there is no problem if the operation of moving the disc 152 to the disc transport unit 13 is performed. Thus, the process proceeds to S18.

In S18, the disc transport controller 11 increments the retry number flag by one, turns OFF the back push flag, and turns ON the eject retry flag. Then the process proceeds to S25.

As a result of the determination in S15, if the back push flag is OFF (no in the figure), the process proceeds to S19. This is the case in which the operation flow is given to S15 from S1311, S1315, or S1318 in FIG. 10.

In FIG. 19, the disc transport controller 11 determines whether an error occurs in the disc transport unit 13.

As a result of the determination in S19, if no error occurs in the disc transport unit 13 (no in the figure), the process proceeds to S25. This is the case in which the operation flow is given to S15 from S1315. In this case, the disc 152 is inside the disc transport unit 13 as shown in (8) in FIG. 5, so that the operation of moving the disc 152 from the ODD to the disc transport unit 13 has been completed as planned.

As a result of the determination in S19, if an error occurs in the disc transport unit 13 (yes in the figure), the process proceeds to S20. This is the case in which the operation flow is given to S15 from S1311 or S1318.

In S20, similarly to S1305 shown in FIG. 10, the disc transport controller 11 determines whether the insertion of the disc 152 into the disc transport unit 13 is sufficient, based on the information about the disc 152 detected by the disc transport unit 13.

As a result of the determination in S20, if the insertion of the disc 152 into the disc transport unit 13 is not sufficient (no in the figure), the process proceeds to S21. This is the case in which the operation flow is given to S15 from S1311. In other words, after the state of Case 3 in FIG. 7, the disc 152 is returned to the ODD in S1306 of FIG. 10 and the jog movement is performed in S1310 of FIG. 10. Thus, it is possible to retry ejecting the disc 152 from the ODD.

In S21, the disc transport controller 11 increments the eject retry number by one and turns ON the eject retry flag. Then the process proceeds to S25.

As a result of the determination in S20, if it is determined that the insertion of the disc 152 into the disc transport unit 13 is sufficient (yes in the figure), the process proceeds to S22. This is the case in which the operation flow is given to S15 from S1318. In other words, after the state of Case 5 in FIG. 7, the operation failed to capture the disc 152 into the disc transport unit 13 by S1312, S1313, S1316, and S1319 in FIG. 10, and the disc 152 is returned to the ODD in S1317. Thus, it is possible to retry ejecting the disc 152 from the ODD.

In S22, the disc transport controller 11 determines whether the capture operation failed and the capture flag is turned ON.

As a result of the determination in S22, if the capture flag is ON (yes in the figure), the process proceeds to S24.

In S24, the disc transport controller 11 turns ON the retry flag relating to the movement of the disc 152 to the disc transport unit 13, and turns OFF the capture flag. Then, the process proceeds to S25.

Note that the capture flag is turned OFF in S24, so that when the operation flow is returned again to S22 through "yes" in S25, which will be described below, the determination in S22 is "no" and the process proceeds to S23. Thus, the operation ends in the error state. When the situation corresponding to Case 5 of FIG. 7 repeatedly occurs in the operation flow in FIGS. 8A and 8B, it may not be much worth performing the loop of the capture operation with the upper limit of 10 times, each time in S1312, S1313, S1316, and S1319 in FIG. 10. Thus, the number of loops of the capture operation is limited to two in S22, S23, and S24.

Next, in S25, the disc transport controller 11 determines whether the number of retries is 10 or less and the eject retry flag is ON.

If the determination in S25 is no, the process proceeds to S25 and ends the operation flow. For example, when the number of retries of the operation of moving the disc 152 from the ODD to the disc transport unit 13 exceeds 10 times, namely, when the determination in S25 is yes and the number of returns to S2 in FIG. 8A exceeds 10 times, the disc transport controller 11 determines that it is not worth repeating and ends the operation flow. Further, when the eject retry flag is OFF, the operation flow is given to S15, for example, from S1315. In this case, the operation of moving the disc 152 from the ODD to the disc transport unit 13 and then to the disc container 15 has been completed as planned. Thus, the operation flow ends.

If the determination in S25 is yes, it is worth retrying although the operation of moving the disc 152 from the IDD to the disc transport unit 13 has not been completed as planned. Thus, the process returns to S2 in FIG. 8A through the part marked (C) in the figure, to retry moving the disc 152 after checking that the disc 152 is loaded into the ODD by the operation flow including S2 to S7.

As described above, when a failure occurs in the operation of moving the disc 152 from the ODD to the disc transport unit 13, the library system 1 according to the present embodiment determines the situation based on the states of both the ODD and the disc transport unit 13. Then, according to the situation, the library system 1 either performs the jog movement to return the disc 152 to the ODD and pull the disc 152 into the disc transport unit 13, or ends the operation in the error state. In this way, it is possible to significantly reduce the problem of the damage to the disc 152, thus improving the reliability of the operation.

The above-described embodiment is merely an example and is not intended to limit the present invention. Other aspects and embodiments will be apparent to those skilled in the art based on the teachings herein without departing from the scope or spirit of the invention disclosed herein.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A library system for storing a plurality of recording media to record and reproduce data, the library system comprising:
    a disc container for storing a plurality of discs which are the recording media;
    an optical disc drive (ODD) configured to write and read information on the disc, and to detect a first movement error via a first detector;
    a disc transport unit configured to transport and exchange the disc by moving between the disc container and the ODD, and to detect a second movement error via a second detector; and
    a controller configured to control the operation of the ODD and the disc transport unit, to retry the operation of moving the disc based on both information about a state of the ODD and information about a state of the disc transport unit, responsive to the ODD detecting the first movement error or the disc transport unit detecting the second movement error in the operation of moving the disc loaded into the ODD to the disc transport unit.

2. The library system according to claim 1, wherein the controller is configured to control the ODD and the disc transport unit to retry the operation of moving the particular disc by allowing the ODD to load the disc again and by moving relative positions of the ODD and the disc transport unit, responsive to the ODD detecting the first movement error or the disc transport unit detecting the second movement error in the movement of the disc loaded into the ODD to the disc transport unit, in which the disc stops at a position where the ODD can pull and load the disc again after the start of the movement from the ODD to the disc transport unit.

3. The library system according to claim 2, wherein the controller is configured to control the ODD and the disc transport unit to stop retrying the operation of moving the particular disc, responsive to the ODD detecting the first movement error or the disc transport unit detecting the second movement error in the operation and a disc surface of the disc comes into contact with the disc transport unit.

4. The library system according to claim 1, wherein when the operation of moving the disc is retried, the controller is configured to control the ODD and the disc transport unit to start the operation again after checking that the ODD has started the operation of recognizing the disc.

5. The library system according to claim 1, wherein the controller is configured to control the ODD and the disc transport unit to retry the operation of moving the particular disc by allowing the ODD to load the disc again and by moving relative positions of the ODD and the disc transport unit, responsive to the ODD detecting the first movement error or the disc transport unit detecting the second movement error in the movement of the disc loaded into the ODD to the disc transport unit, in which the disc stops with the insertion into the disc transport unit being less than a predetermined amount after the start of the movement from the ODD to the disc transport unit.

6. The library system according to claim 1, wherein the controller is configured to allow the disc transport unit to perform the operation of capturing the disc until the number of retries reaches a predetermined number of times, responsive to the ODD detecting the first movement error or the disc transport unit detecting the second movement error in the movement of the disc loaded into the ODD to the disc transport unit, in which the disc stops with the insertion into the disc transport unit being more than a predetermined amount after the start of the movement from the ODD to the disc transport unit, and
wherein the controller is configured to stop the ODD to retry to load the disk again, responsive to a determination that the disc transport unit does not capture the disc within the predetermined number of times.

7. The library system according to claim 6,
wherein the controller is configured to set the number of retries of the operation of moving the disc after loading the disc into the ODD again, to a value less than the predetermined number of times of the operation of capturing the disc into the disc transport unit.

\* \* \* \* \*